United States Patent [19]

Ogawa

[11] Patent Number: 4,751,100

[45] Date of Patent: Jun. 14, 1988

[54] MAGNETIC RECORDING MEDIUM AND METHOD FOR MAKING THE SAME

[75] Inventor: Kazufumi Ogawa, Hirakata, Japan

[73] Assignee: Matsushita Electric Industrial Co., Ltd., Kadoma, Japan

[21] Appl. No.: 21,594

[22] Filed: Mar. 2, 1987

Related U.S. Application Data

[63] Continuation of Ser. No. 622,238.

[30] Foreign Application Priority Data

Jun. 20, 1983 [JP] Japan .................................. 58-111269
Sep. 6, 1983 [JP] Japan .................................. 58-164442

[51] Int. Cl.$^4$ ................................................ G11B 5/84
[52] U.S. Cl. ...................................... 427/38; 427/128; 427/129; 427/130; 427/131; 428/409; 428/694; 428/900
[58] Field of Search ............... 428/694, 900, 695, 409; 427/38, 131, 129, 130; 360/134-136

[56] References Cited

U.S. PATENT DOCUMENTS

| | | | |
|---|---|---|---|
| 3,792,452 | 2/1974 | Dixon | 427/38 |
| 3,915,757 | 10/1975 | Engel | 427/38 |
| 4,177,297 | 12/1979 | Josephs | 427/38 |
| 4,188,426 | 2/1980 | Auerbach | 428/422 |
| 4,372,985 | 2/1983 | Bailey | 427/131 |
| 4,451,500 | 5/1984 | Gerard | 427/38 |
| 4,491,653 | 1/1985 | McGinniss | 525/356 |
| 4,495,242 | 1/1985 | Arai | 428/900 |
| 4,520,040 | 5/1985 | Cordts | 427/38 |
| 4,565,734 | 1/1986 | Arai | 428/900 |

OTHER PUBLICATIONS

IBM, Tech. Disclosure Bulletin, vol. 17, (No. 11) Apr. 1975, A. Stoffel.

Primary Examiner—Ellis P. Robinson
Attorney, Agent, or Firm—Cushman, Darby & Cushman

[57] ABSTRACT

A method for making a magnetic recording medium which comprises:
energizing ferromagnetic ultra-fine particles with a predetermined energy level, and implanting the energized ultra-fine particles into a non-magnetic substrate, at a predetermined range of depth from a principle surface of the substrate, to form a magnetic recording layer.

6 Claims, 6 Drawing Sheets

MAGNETIC RECORDING MEDIUM AND METHOD FOR MAKING THE SAME

This is a continuation of application Ser. No. 622,238, filed June 19, 1984, which was abandoned upon the filing hereof.

BACKGROUND OF THE INVENTION

1. Field of the Invention

The present invention relates generally to a method of manufacturing a magnetic recording medium and an opto-magnetic recording medium, and especially to a magnetic tape, a magnetic disc, an opto-magnetic disc, a magnetic card or the like, and furthermore relates to methods of manufacturing an amorphous magnetic recording medium and an abrasion-resistive magnetic recording medium.

2. Description of the Prior Art

A typical conventional magnetic recording medium is classified into two types. One is a coated type and other is a vacuum deposited type. In respect to the coated type magnetic recording medium, generally, a kind of paint prepared by dispersing magnetic powder of $Fe_2O_3$ or $\gamma$-$Fe_2O_3$ added with Co in a mixture of polyvinyl-butyral, toluene and methyl-iso-butyl-ketone etc., is coated on a substrate 4–5 $\mu$m thick. Though the above-mentioned process is easy, there is a limitation in decreasing particle size of the magnetic powder, and no sufficient characteristic has been expected for a high density recording.

On the other hand, as to a vacuum deposition type, the density of the recording is better than that of the coating type of magnetic recording medium, there is a problem of insufficient durability, since a ferromagnetic metal layer is exposed on a surface of the substrate. In order to improve it, a proposal has been made that on a 1000–2000Å thick metal layer formed by electron beam method or a spattering, an overcoating is carried out, and further thereon a lubricant is coated. Nevertheless, in the present situation, its durability has not yet been sufficient. In addition thereof, a magnetic field of a recording head needs to be considerably strengthened as a result of providing of such an overcoat or a lubricant layer.

SUMMARY OF THE INVENTION

The purpose of the present invention is to provide a magnetic and opto-magnetic recording medium suitable for higher recording density and of an improved durability in comparison with the conventional magnetic recording or opto-magnetic recording medium.

The other purpose of the present invention is to provide an improved method for producing a magnetic or opto-magnetic recording medium.

The magnetic recording medium in accordance with the present invention comprises:
a non-magnetic substrate and
a magnetic recording layer having implanted ferromagnetic ultra-fine particles at a predetermined range of depth from a principal surface of the substrate.

The method for making a magnetic recording medium in accordance with the present invention comprises:
energizing ferromagnetic ultra-fine particles with a predetermined energy level, and
implanting the energized ferromagnetic ultra-fine particles into a non-magnetic substrate, at a predetermined range of depth from a principal surface of the substrate, to form a magnetic recording layer.

BRIEF DESCRIPTION OF THE DRAWINGS

FIG. 7($a$) is a cross-sectional view of another embodiment of magnetic recording medium produced by the "knock-on" process.

DETAILED DESCRIPTION OF A PREFERRED EMBODIMENT

Figure 1:
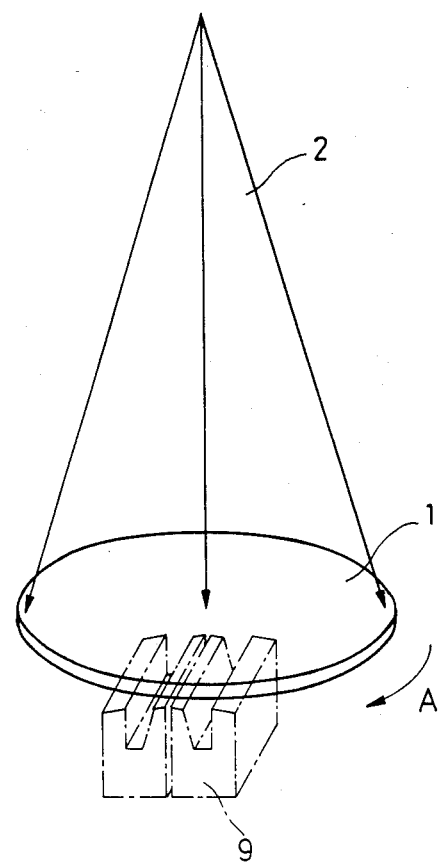
FIG. 1 is a schematic perspective view of an embodiment of the method of the present invention.

As FIG. 1 shows, ionized ferromagnetic metal atoms or ferromagnetic oxidized metal molecule ions are implanted all over in the surface of a substrate disc (made of an organic material, such as a polyester or a polyimide, or of a non-magnetic metal, such as Al or Cu, etc.) under a predetermined accelerating electric field. For example, in order to form the magnetic recording layer 3 of a ferromagnetic metal, ultra-fine particles of Fe, Ni, Cr, or Co or a rare earth metal or the like in a depth of 0.1 $\mu$m from the surface of the substrate, the metal atoms or the rare earth metal atoms are ionized, and the ionized metal atoms are implanted at an atom density of about $10^{18}$ atoms/cm$^2$ under an acceleration voltage of about 100 kV.

Figure 2:
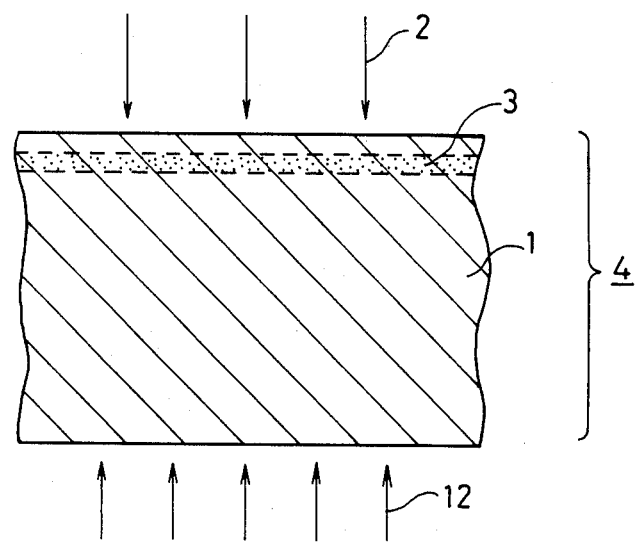
FIG. 2 is a cross-sectional view of a magnetic recording medium which is produced by the method of the present invention.
Figure 3:
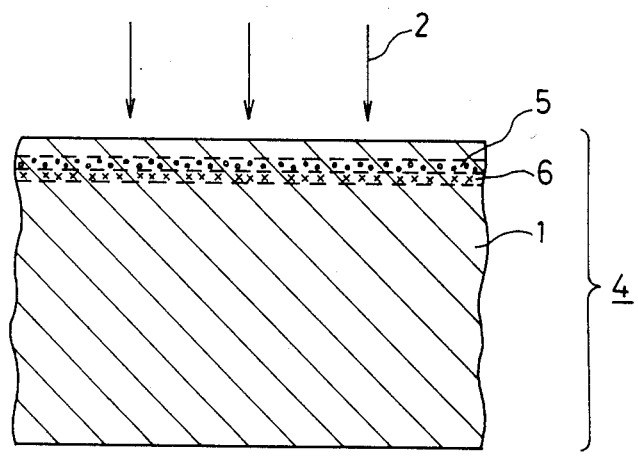
FIG. 3 is a cross-sectional view of another magnetic recording medium of the present invention, which has two layers of the magnetic recording medium.

FIG. 2 shows a cross-sectional structure of the magnetic recording medium 4 made under the method as above-mentioned. The magnetic recording layer 3 may be formed by oxide(s) of the above-mentioned metal(s). Furthermore, in order to form a double-layered structure of the magnetic recording layer 3 of two different ferromagnetic metals or the like the accelerating voltage may be changed responding to difference of the material. For instance, in case of the magnetic recording layer 3 having the double-layered structure of a Co-Cr layer and a Ni-Fe layer, a cross-sectional structure shown in FIG. 3 is obtainable by a first implantation of the Ni and the Fe under a first acceleration voltage, followed by a second implantation of Co and Cr under a second acceleration voltage which is lower than the first one. In this way, the magnetic recording medium, which has the Co-Cr layer 5 at a part near the surface of the substrate and the Ni-Fe layer 6 immediately under that Co-Cr layer 5, can be produced.

Figure 4:
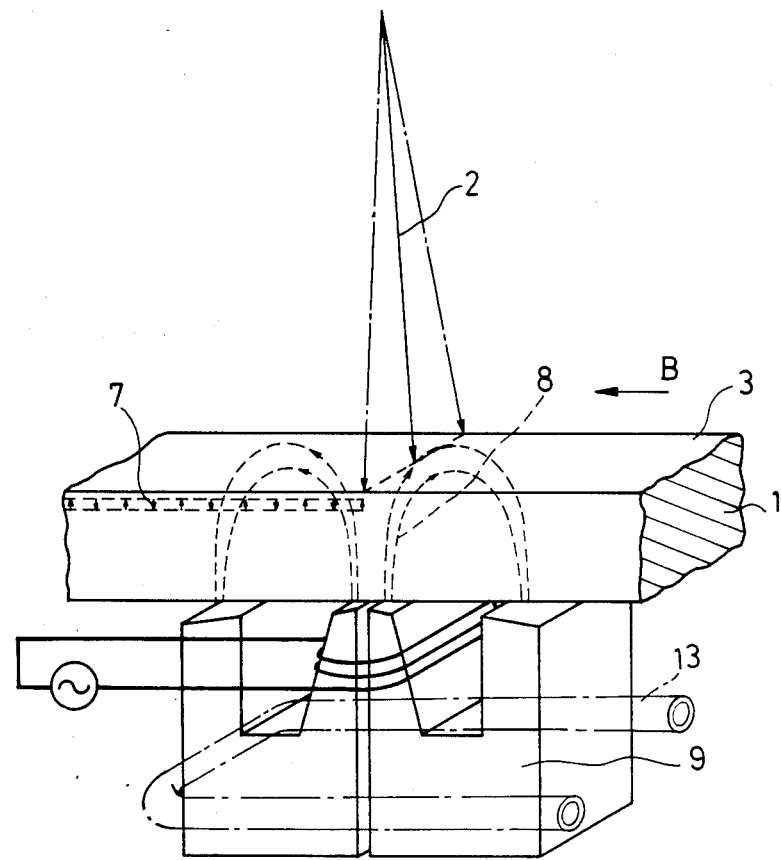
FIG. 4 is a schematic perspective view of another embodiment of the method of the present invention, and especially it is concerned with a method for orientation of an axis of easy magnetization.

Furthermore, in order to get a higher density of recording medium, an axes of easy magnetizations are arranged by impressing a magnetic field from a backside of the substrate when ions of the ferromagnetic metal are implanted in the substrate 1. Thereby, orientations of magnetic moments of the ultra-fine particles of the ferromagnetic metal in predetermined direction(s) can be attained. For example, a vertical orientation of the magnetic moment 7 to the substrate 1 can be obtained by impressing a magnetic field 8 which has a dominant substantially vertical component on the surface of the substrate 1 from the backside thereof, as shown in FIG. 4. Furthermore, in case alternate changes of directions of the magnetic moments are intended, the ion implantation into the substrate 1 may be made alternately changing the magnetic field in synchronism with longitudinally moving of the recording medium (as shown by an arrow B in FIG. 4) by means of an AC electro-magnet 9.

Instead of the above-mentioned ion implantation under the magnetic field, the same effect is obtainable by carrying out heat treatment under the magnetic field after the ion implantation is completed.

In order to produce the magnetic recording layer uniformly, it is a good way to sweep an ion beam at random. In case the recording medium is a disc, more uniform forming of the magnetic recording layer is obtained by rotation of the substrate during the ion implantation (as shown by arrow A in FIG. 1). This method can decrease nonuniformity of the ion-implantation to an extremely low limit. When the recording medium is in the shape of a tape, uniformity of the recording medium is attained by sweeping ion beam perpendicularly to the direction of the tape running direction, as shown in FIG. 4.

Though the temperature of the substrate is likely to rise due to the energy of the ions, the temperature rise can be prevented by flowing cooling water in a water piping 13 of the electromagnet 9, and, as a result, cooling the tape through the electromagnet 9.

The magnetic recording medium obtained by the above-mentioned production method has a configuration such that the material of the substrate exists on the principal surface, covering the ion-implanted layer of the ferromagnetic ultra-fine particles thereunder. Accordingly, no particular overcoating process is necessary unlike the conventional method. But, in case still smooth or abrasion-resistive surface is intended to be formed, the following measures are preferable.

Figure 5:
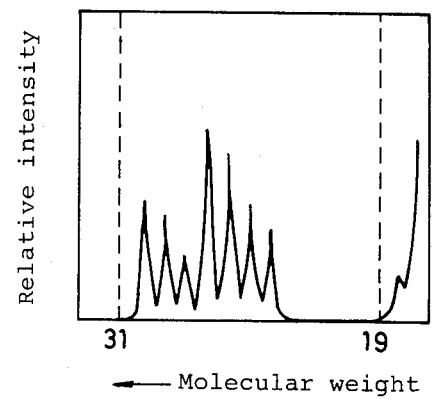
FIG. 5($a$) and FIG. 5($b$) are graphs of the SIMS (Secondary Ion Mass Spectroscopy) without and with the treatment for surface treatment, respectively, of the magnetic recording media made in accordance with the present invention.
Figure 5:
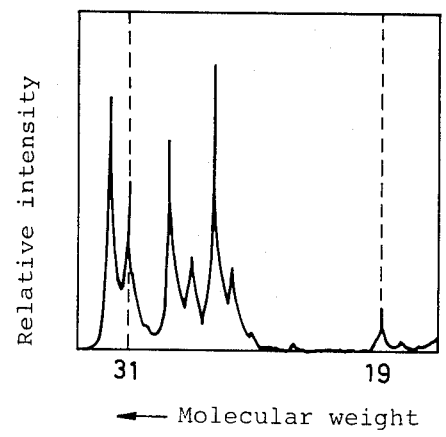

For instance, in case of adopting the high polymer organic material as the substrate (e.g. polyester or polyimide film etc.), it is possible to change the surface of the substrate to a fluoro-compound by applying a plasma treatment in an atmosphere including a fluorine-containing gas ($CF_4$ etc.). The organic fluoro-compound has, as is well known, for instance, from teflon (E.I. DuPont de Nemours and Co. in U.S.A.), a low coefficient of friction and high durability against abrasion, and therefore, by converting the surface of the substrate into such fluorine-containing compound, reliability greatly rises. Since this layer is the material that the surface of the substrate itself is changed to the organic fluoro compound, it does not peel off. Test results are shown in FIG. 5(a) and FIG. 5(b). As an example, polyester film was used as the material of the substrate, and this substrate was treated in a vacuum of 0.35–0.4 torr including a tetrafluoro-carbon gas ($CF_4$) as a reaction gas. A high frequency electric field of 20 W is applied, and the substrate was treated for five minutes in the plasma gas atmosphere. And SIMS (secondary ion mass spectroscopy) analysis of the samples is shown in FIG. 5(a) and FIG. 5(b). In FIG. 5, the ordinate is graduated with relative density of each molecule, and abscissa is graduated with each molecular weight. FIG. 5(a) shows a case without the plasma treatment, and FIG. 5(b) shows a case with the plasma treatment. As is obvious from the comparison of FIG. 5(a) and FIG. 5(b), the relative intensity of SIMS output (on the ordinates) is almost zero at the molecular weights 19 (fluorine (F)) and 31 (fluorocarbon (CF)) in FIG. 5(a); and on the contrary in FIG. 5(b) the relative intensity takes certain values at the molecular weights 19 and 31. Thus, it was proved that a combination of CF exists in the substrate treated in the plasma atmosphere.

From the above, it is observed that, by the plasma treatment, the combinations of hydrocarbon in the substrate are cut and recombinations with fluoro radical are realized. On the other hand, in case a non-magnetic material, for example, Al or Cu is used as the substrate, a film of $Al_2O_3$, AlN, CuO and $Cu_3N_2$, etc. can be formed by the plasma treatment of $O_2$ or $N_2$ on the surface of the substrate. And the durability to the abrasion is improved, and also an effect to prevent an oxidation is obtainable. The same result is attainable irrespective of order of these plasma treatments being before or after forming of the magnetic recording layer.

Figure 6:
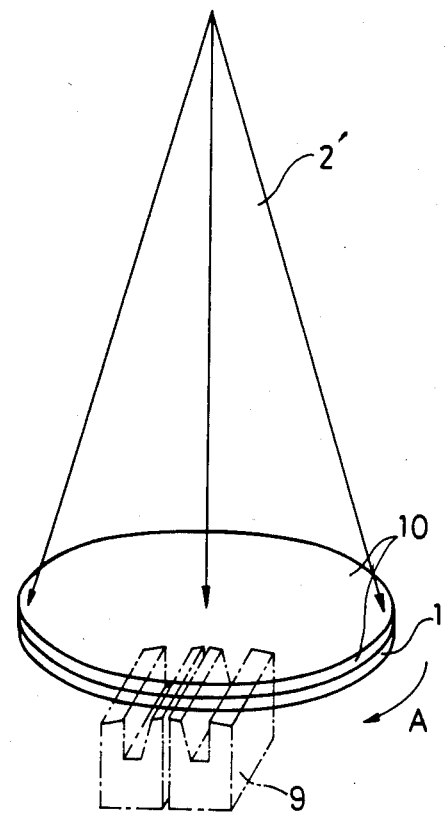
FIG. 6 is a schematic perspective view of another embodiment of the method of a "knock-on" process.
Figure 7A:
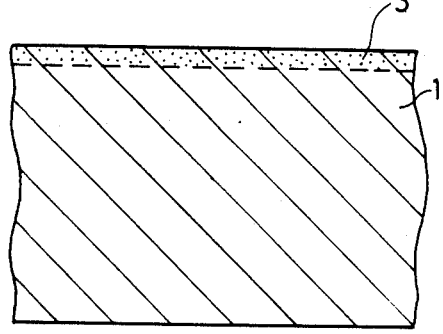
FIG. 7 is a cross-sectional view of an embodiment of magnetic recording medium produced by the "knock-on" process.
Figure 7:
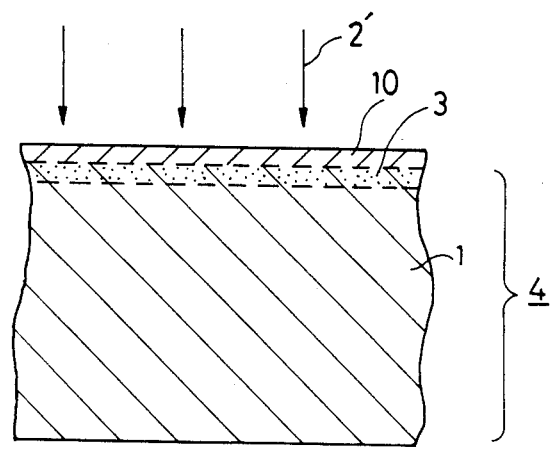

Another mode of the present invention is described with reference to FIG. 6 and thereafter. As FIG. 6 shows, the ferromagnetic metal layer 10 (for example, at least one of Fe, Ni, Co, Mn, rare earth metals, or their alloys and oxides, inclusive) is formed on the whole surface of the substrate 1 shaped in a disc of organic high polymer, such as, polyester, polyimide, etc. or a non-magnetic metal, such as Al, Cu, or the like. Subsequently, an ionized substance which has larger atomic number than the above-mentioned ferromagnetic substance (for example, As, Sb, In, Ti, or their components inclusive) is implanted on the whole surface of the above-mentioned ferromagnetic film 10 under a predetermined acceleration voltage. In FIG. 6, an arrow 2 designates an ion beam of the substance being implanted, and an arrow A designates the direction of rotation of the substrate disc. In this process, a part of the atoms of the ferromagnetic metal film formed in advance, is knocked by the implanting ion atoms, and is implanted through the surface into the substrate 1 by the phenomenon called "knock on effect". The ferromagnetic metal layer which is implanted becomes an amorphous metal. By etching the ferromagnetic metal film 10, the magnetic recording medium, which is implanted with ultra fine particles of the ferromagnetic metal, is produced as a result of removal of the ferromagnetic film 10. For example, the film 10 of ferromagnetic metal (Fe, Ni, Co, Cr, rare earth metal, and their alloy etc.) is deposited about 0.1 μm thick on the surface of the substrate 1, as shown by FIG. 7. Next, the ion beams 2 of the ionized heavy atoms (As ion, Ti ion etc.) is implanted at a density of about $10^{16}/cm^2$ on the surface of the ferromagnetic metal 2 with 200 KV of the acceleration voltage. The ferromagnetic metal atoms which are knocked out of the ferromagnetic metal film 10 formed in the previous process are implanted through the surface of the substrate, and into the above-mentioned substrate to about 1000Å depth from the surface, and form the metal layer 3 (magnetic recording layer) of the ferromagnetic ultra fine particles.

Figure 8:
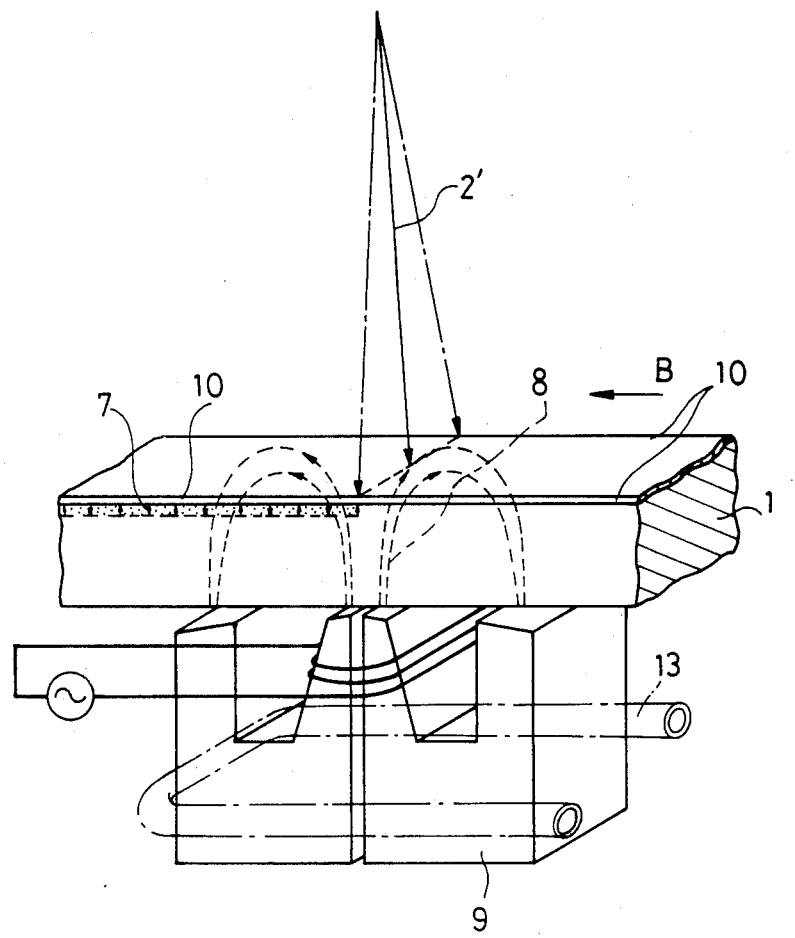
FIG. 8 is a schematic perspective view of an embodiment of the method of the present invention, especially for orientation of the axis of easy magnetization in the "knock-on" process.

Furthermore, in order to obtain recording of a higher density, the axis of easy magnetization, can be orientated, by adding a magnetic field from the backside of the substrate when the ion beams are implanted into the ferromagnetic metal film 2. In other words, it is possible to orientate in a predetermined direction the magnetic moments of the ferromagnetic metal particles, which are implanted by "knock on". For instance, a vertical orientation of the magnetic moment 7 to the surface of the substrate 1 can be obtained by impressing a magnetic field 9 which has a dominant substantially vertical component to the surface of the substrate 1 from the backside thereof, as shown in FIG. 8. Furthermore, in case alternate changes of directions of the magnetic moments are intended, the ion implantation into the substrate 1 may be made alternately changing the magnetic field in synchronism with longitudinal moving of the recording medium (as shown by an arrow B in FIG. 8) by means of an AC electro magnet 9.

In order to produce the magnet recording layer uniformly, it is a good way to sweep an ion beam at random. In case the recording medium is a disk, higher uniformity of the magnetic recording layer is obtained by rotation of the substrate during the ion implantation as shown by arrow A in FIG. 6. When the recording medium is in the shape of a tape, uniformity of the recording media is attained by sweeping the ion beam perpendicularly to the direction of the tape running as shown in FIG. 8.

Though the temperature of the substrate is likely to rise due to the energy of the ions, the temperature rise can be prevented by flowing cooling water in a water piping 13 of the electromagnet 9, and as a result cooling the tape through the electro magnet 9. Lastly, the high density magnetic recording medium can be obtained by removing the ferromagnetic metal film 10 by known etching, or the like.

On the other hand, since the ferromagnetic metal film has become amorphous in the above-mentioned process, it is obvious that an amorphous magnetic recording medium is obtainable leaving the amorphous film as it is without removing. Since the knock-on effect is not necessary in this last-mentioned process, the mass of the ions is not limited to the heavy ones or light ones.

Furthermore, opto-magnetic recording medium is obtainable by using transparent substrates, such as, glass, poly-methyl-meta-acrylate, or poly-carbonate, etc.

This species of the present invention is especially suitable for making an opto-magnetic recording medium, wherein precision controlling of the component like $Cd_{28.4-y}Tb_yCo_{71.4}$ is necessary, since the knock-on method does not alter the composition of the ferromagnetic layer.

What is claimed is:

1. A method for making a magnetic recording medium, comprising:

energizing a plurality of ferromagnetic ultra-fine particles with a predetermined energy level by ionizing a ferromagnetic metal into an ion plasma;

implanting said energized ferromagnetic ultra-fine particles into a non-magnetic substrate made of an organic polymer resin, with a predetermined range of depth from a principal surface of said substrate, to form a magnetic recording layer, by accelerating said ions by use of an electric field of a predetermined intensity and thereby implanting said ions into said non-magnetic substrate; and treating said principal surface of said substrate with a reactive plasma in an atmosphere including a fluorine-containing gas.

2. The method for making a magnetic recording medium in accordance with claim 1, which is further characterized in that said implanting is carried out in a dominant magnetic field applied from an opposite surface to said principal surface, thereby to orientate axes of easy-magnetization of said ferromagnetic ultra-fine particles in a vertical direction to said principal surface.

3. The method for making a magnetic recording medium in accordance with claim 1, wherein said substrate is of a light-transparent material.

4. A method for making a magnetic recording medium, comprising:

depositing a film of ferromagnetic material onto a principal surface of a non-magnetic substrate made of an organic polymer resin;

implanting ions into said film of ferromagnetic material by accelerating an ionized substance by use of an electric field of a predetermined intensity, thereby to alter said ferromagnetic material into an amorphous ferromagnetic material provided on said substrate; and treating said principal surface of said substrate with a reactive plasma in an atmosphere including a gas containing fluorine.

5. The method for making a magnetic recording medium according to claim 4, wherein:

said ionized substance has an atomic number or a molecular number which is larger than that of said ferromagnetic material, and an effect of accelerating said ionized substance into said film of ferromagnetic material is to knock some atoms of said ferromagnetic material through said principal surface and into said substrate to a predetermined range of depth; and thereafter removing a remainder of said ferromagnetic film from said substrate so as to expose said principal surface.

6. The method of claim 5, wherein:

the step of treating said principal surface of said substrate with a reactive plasma in an atmosphere including a fluorine-containing gas is conducted after said remainder of said ferromagnetic film has been removed.

* * * * *